US006833069B1

(12) United States Patent
Asterlin

(10) Patent No.: US 6,833,069 B1
(45) Date of Patent: Dec. 21, 2004

(54) MAGNETIC FILTER

(76) Inventor: Gunther E. Asterlin, 100 Anchor Rd., P.O. Box 735, Michigan City, IN (US) 46360

( * ) Notice: Subject to any disclaimer, the term of this patent is extended or adjusted under 35 U.S.C. 154(b) by 201 days.

(21) Appl. No.: 10/193,883

(22) Filed: Jul. 12, 2002

Related U.S. Application Data

(63) Continuation-in-part of application No. 09/819,429, filed on Mar. 28, 2001, now Pat. No. 6,638,425.

(51) Int. Cl.[7] ......................... B01D 35/06; B01D 21/26; B03C 1/00

(52) U.S. Cl. ....................... 210/222; 210/407; 210/408; 210/512.1; 209/223.1; 209/224; 209/232; 15/256.5

(58) Field of Search ................................ 210/222, 695, 210/407, 512.1, 408; 209/232, 223.1, 224; 15/256.5

(56) References Cited

U.S. PATENT DOCUMENTS

| | | | | |
|---|---|---|---|---|
| 4,394,264 A | * | 7/1983 | Schimion et al. | 210/222 |
| 5,188,239 A | * | 2/1993 | Stowe | 210/222 |
| 5,393,421 A | * | 2/1995 | Ohe et al. | 210/222 |
| 6,579,454 B2 | * | 6/2003 | Käske | 210/222 |

* cited by examiner

*Primary Examiner*—David A. Reifsnyder
(74) *Attorney, Agent, or Firm*—Botkin & Hall; James D. Hall

(57) ABSTRACT

A magnetic filter removes magnetic particles from fluid communicated through the filter. The filter includes elongated, circumferentially spaced magnetic elements which capture magnetic particles entrained in the turbulent passing fluid. The magnetic elements must be cleaned periodically to remove the particles from the elements by moving a scraper plate from one end of the housing to the other. At the end of travel of the scraper plate, the particles are scraped upon non-magnetic end portions (which may contain residual magnetism) of the magnetic elements, from which they are flushed by fluid communicated through the inlet port out through other ports provided on the housing.

6 Claims, 8 Drawing Sheets

MAGNETIC FILTER

CROSS REFERENCE TO RELATED APPLICATION

This is a continuation-in-part of application Ser. No. 9/819,429 filed Mar. 28, 2001, now U.S. Pat. No. 6,638,425.

TECHNICAL FIELD

This invention relates to a magnetic filter for separating magnetic particles from fluids.

BACKGROUND OF THE INVENTION

Many industrial processes generate fluids in which magnetic particles are suspended. For example, motor vehicles are commonly painted by dipping the entire body into a large paint bath. Since the body is assembled by welding and the welds are sanded, many iron particles remain loosely attached to the vehicle. When the vehicle is dipped into a paint bath, these particles mix with the paint. Accordingly, it is desirable to remove the particles from the paint continuously. Similarly, many industrial machining processes use cooling fluids, such as oil, in which magnetic particles may be suspended, and it is accordingly necessary to remove these particles from the oil.

Centrifuges and magnetic filters have been used in the prior art to remove magnetic particles suspended in fluids. Centrifuges are effective for removing large particles, but are ineffective in removing small particles, and it is desirable in many processes that small particles be removed. Magnets and magnetic filters are effective in removing small particles, but these particles remain attached to magnets, and filters incorporating magnets for the removal of magnetic particles must be cleaned at regular intervals. However, the cleaning of magnetic filters to remove magnetic particles captured by magnets within the filter is relatively expensive, since it requires substantial

SUMMARY OF THE INVENTION

According to the present invention, a magnetic filter having multiple elongated magnetic elements which terminate in non-magnetic end portions is provided with a scraper which can be periodically actuated to scrap the particles that have been retained on the magnet in elements onto the non-magnetic end portions. Turbulence is introduced into the filtered fluid. This produces a highly efficient filtration process. The fluid being processed flushes the particles from the end portion into a flushing chamber, from which the fluid is discharged from the magnetic filter. The same turbulent flow induced fluid is used to remove the particles from the magnetic filter as is being processed by the magnetic filter and no disassembly is required.

DETAILED DESCRIPTION

Figure 1:
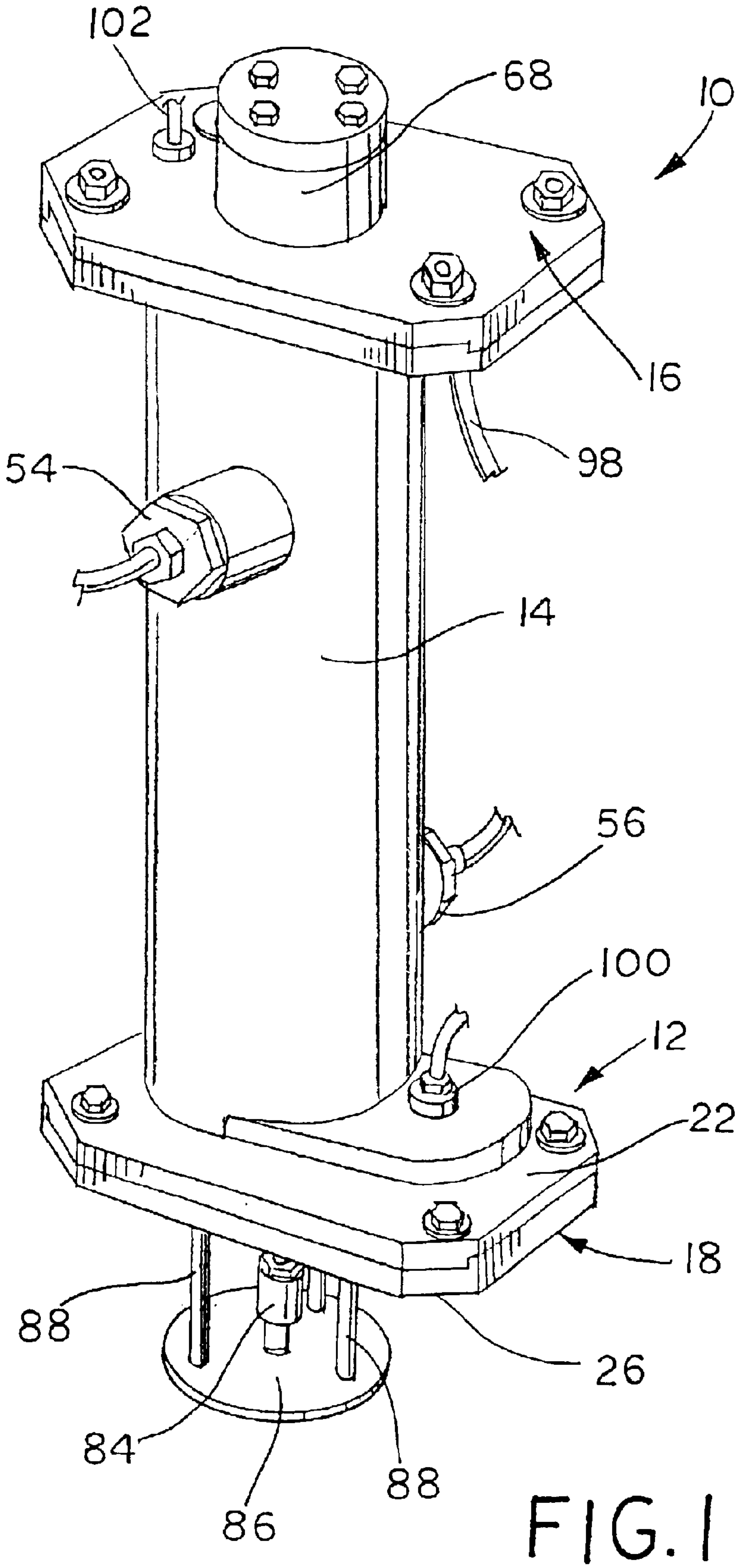
FIG. 1 is a view in perspective of a magnetic filter made pursuant to the teachings of the present invention.

Referring now to the drawings, a magnetic filter made pursuant to the present invention is generally indicated by the numeral 10. Magnetic filter 10 includes a housing generally indicated by the numeral 12, which includes a longitudinally extending portion 14, and a pair of transverse end portions 16, 18 mounted on opposite ends of the longitudinally extending portion 14. Each of the end portions 16, 18 includes an end plate 20, 22, each of which is secured to opposite ends of the longitudinal extending portion 14, and a removable cover plate 24, 26 each of which is secured to the corresponding end plates 20, 22 by appropriate fasteners 28.

The housing portion 14 circumscribes multiple (in this case six) longitudinally extending, elongated, substantially parallel magnet elements 30A–F. The magnet elements 30A–F each include an outer housing 32 that terminates in transverse ends 34, 36. Each of the transverse ends 34, 36 define an aperture that receives a correspondingly pin 38, 40 mounted on the corresponding end plates 24, 26 to thereby position the magnetic elements 30A–5 in their proper locations within the housing portion 14. Each of the housings 32 enclose multiple magnetic segments which include two end segments 42, 44 and multiple intermediate segments 46 which extend between the end segments 42, 44. The segments 42, 44 and 46 are maintained an axial alignment by the housing 32 of each of the magnetic elements 30A–F. Each of the segments 42, 44 and 46 define a magnetic axis extending between north and south magnetic poles at opposite ends thereof, and each of the intermediate segments are installed in their corresponding housings 32 such that the north pole of one of the intermediate segments is continuous with the south pole of an adjacent segment. The housings 32 extend beyond the outer ends of the end segments 42 and 44 to define non-magnetic portions 48, 50 of each of the magnetic elements 30A–F. Although the end portions 48, 50 are nominally non-magnetic, there will be residual magnetism in the end portions 48, 50.

Fluid containing magnetic particles suspended therein is admitted into the housing 12 through an inlet port 54 and is discharged through an outlet port 56. As the fluid communicates through the housing between the inlet and outlet ports, magnetic particles entrained in the fluid are captured on the surface of the magnetic elements 30A–5. Although some of the particles will be distributed over the entire surface of the magnetic elements 30A–5, the particles will tend to concentrate at the juncture between the north and south poles of adjacent magnetic segments 42, 44 and 46. The particles must eventually be removed from the magnetic elements 30A–5, but the frequency that they must be removed is a function of the concentration of the magnetic particles in the fluid. Prior art of the magnetic filters required disassembly of the housing 12, removal of the magnetic elements 30A–F, and manual removal of the magnetic particles from the elements 30A–F.

According to the invention, elements 30A–F are cleaned by a scraper plate generally indicated by the numeral 58. Plate 58 is slideably received within housing portion 14, and includes circumferentially spaced apertures 60A–F, which slideably receive corresponding magnetic elements 30A–F.

Figure 6:
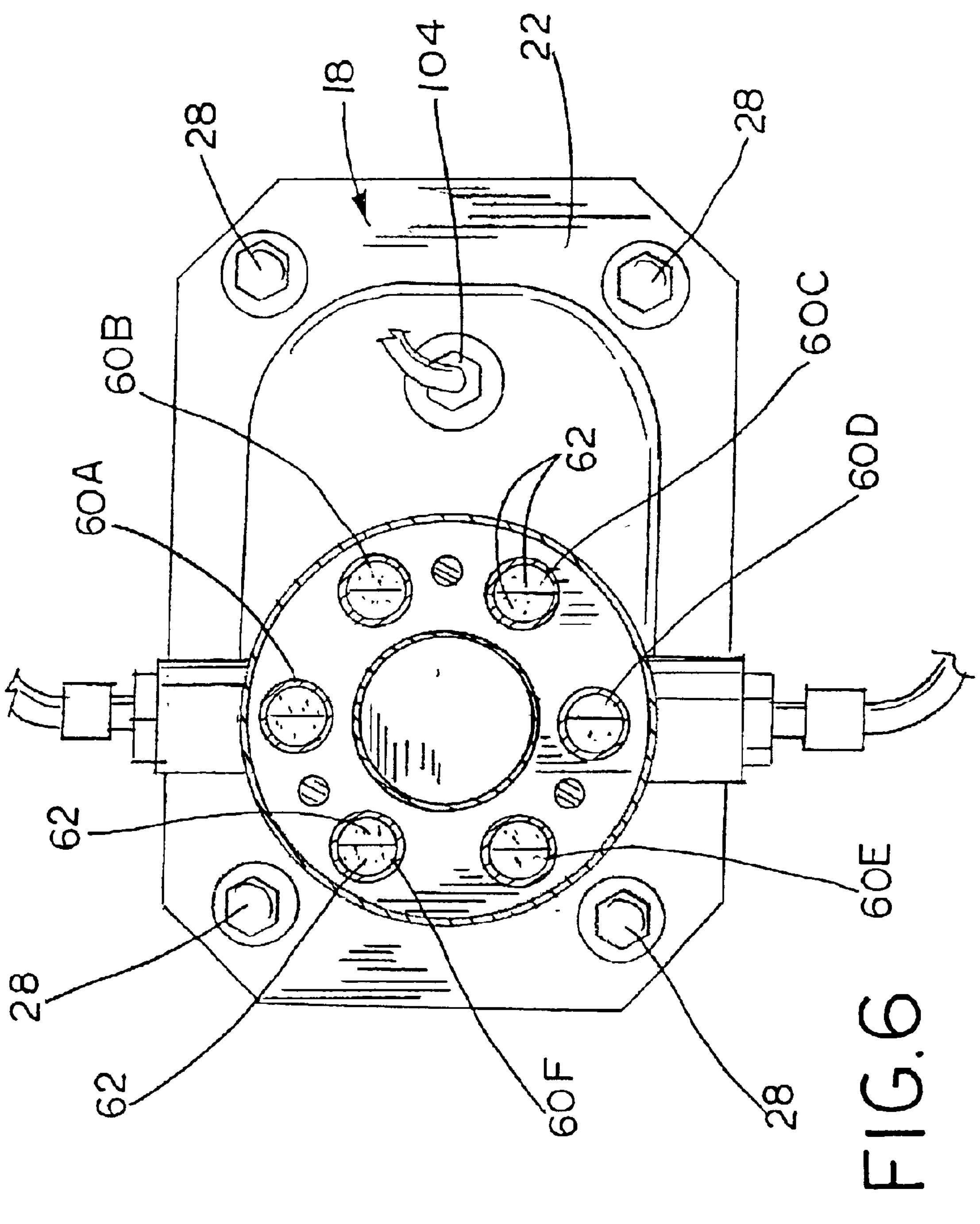
FIG. 6 is a cross-sectional view taken substantially along line 8—8 of FIG. 3.

Mounted within each of the apertures 60A–F are bronze wipers 62 (FIG. 6) that frictionally engage the outer surface of magnetic elements 30A–F to wipe the particles collected on the magnetic elements port onto one of the end portions 48 or 50 at opposite ends of the magnetic elements. Plate 58 is operated by a hydraulic piston and cylinder assembly generally indicated by the numeral 64. Assembly 64 includes a cylinder housing 66 which includes an enlarged portion 68 defining a shoulder 70 with the smaller diameter portion thereof. A cylinder rod 72 extends from one end of the housing 66 and is connected to a double acting hydraulic cylinder (not shown) which is slideable within the housing 66 in a manner well known to those skilled in the art. Fluid fittings 74, 76 are connected to an appropriate source of hydraulic pressure. Hydraulic pressure is admitted into fitting 74 while fitting 76 is communicated to sump pressure to move the polar rod 72 to the left viewing the Figures, and the fitting 76 is communicated to hydraulic pressure while fitting 74 is communicated to sump pressure to move the rod 72 to the right viewing the Figures.

Figure 2:
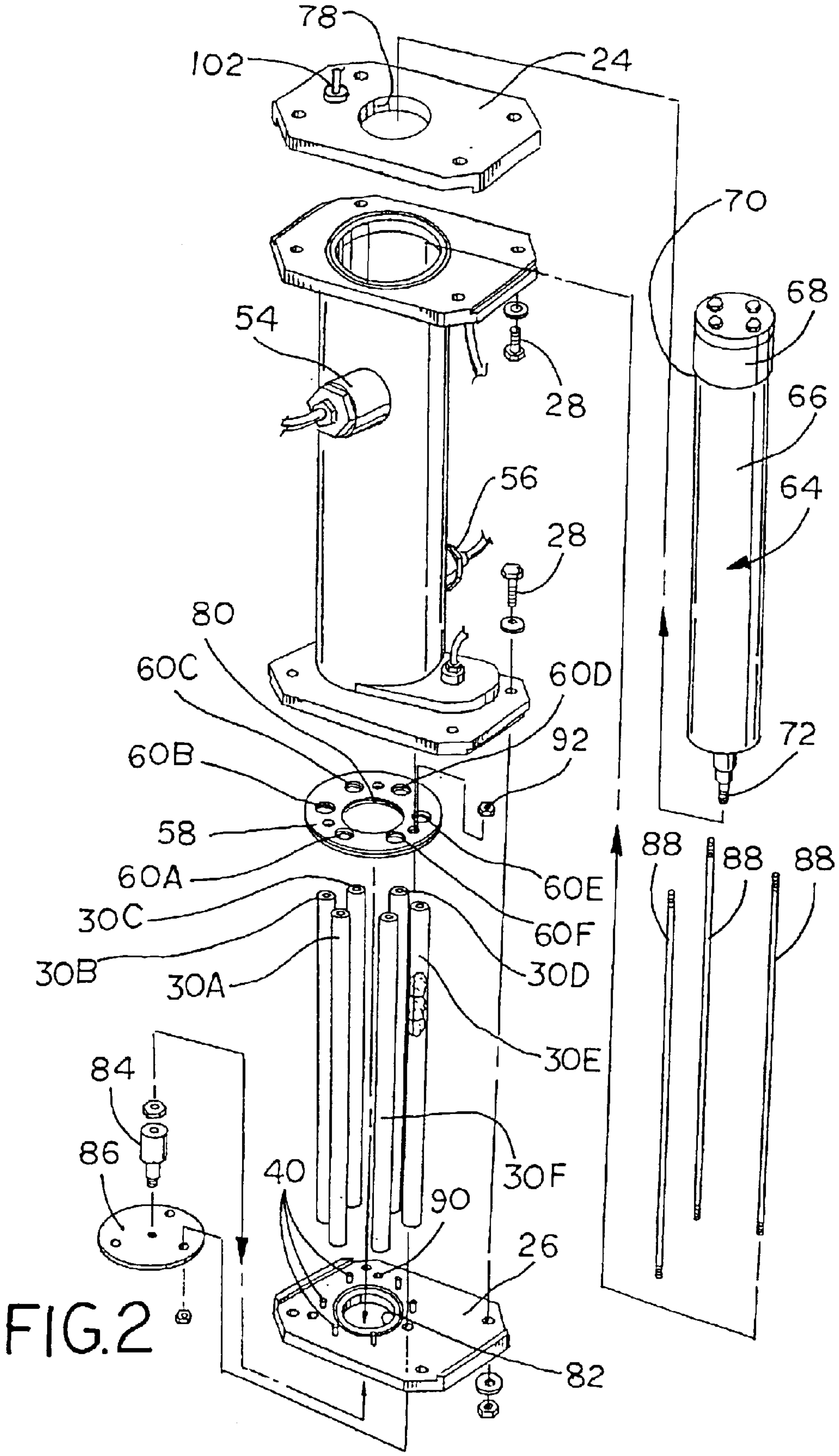
FIG. 2 is an exploded view in perspective of the magnetic filter illustrated in FIG. 1.

The piston and cylinder assembly 64 is installed in the housing 12 through an aperture 78 in the end plate 24, and extends through an aperture 80 in the scraper plate 58, and an aperture 82 in the end plate 26. Accordingly, the hydraulic piston and cylinder assembly 64 is supported within the housing 12 coaxial with the scraper plate 58 and coaxial with the volume defined by the magnetic elements 30A–F. The shoulder 70 is seated on the outer surface of the plate 24 to establish the proper position of the piston and cylinder assembly 64. Accordingly, the piston rod 72, even in its retracted position illustrated in FIGS. 2 and 3, extends beyond the end of the end plate 26 as does a portion of the housing 66 carrying the fitting 76. The fitting 74 is also exterior of the housing, being located on the enlarged portion of 68. An appropriate fastener 84 secures the piston rod 72 to a push/pull plate 86. Push/pull plate 86 is secured to scraper plate 58 by rods 88, which are secured to the push/pull plate 86 by appropriate fasteners and extend through corresponding apertures 90 in end plate 26 and are secured to the scraper plate 58 by fasteners 92. Flushing chambers 94, 96 are defined within each of the end plates 20, 22 and are provided with drain lines 98, 100.

Figure 3:
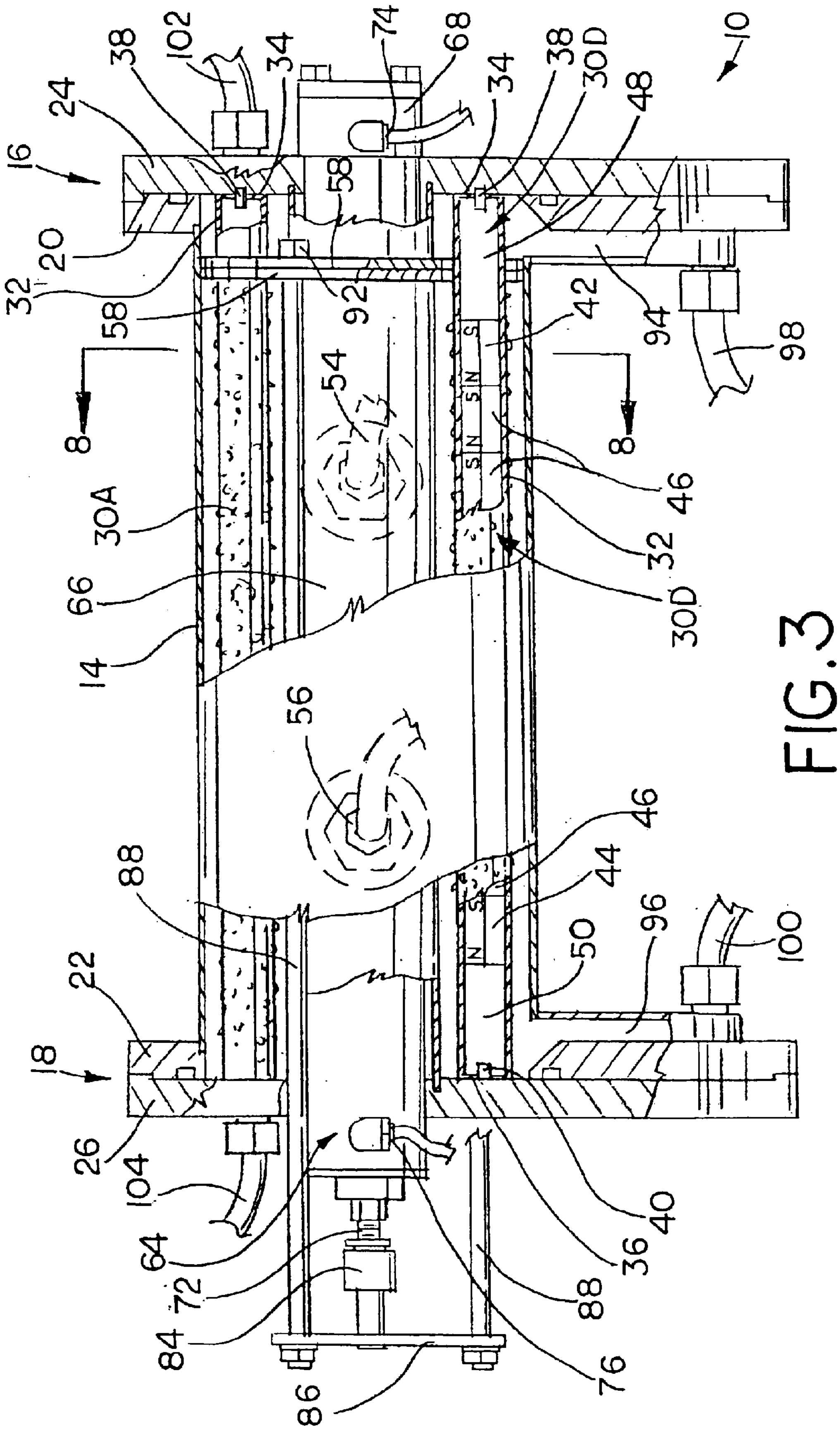
FIGS. 3–5 are longitudinal cross-sectional views of the magnetic filter illustrated in FIGS. 1 and 2, with the scraper removing the particles captured by the magnets within the filter housing as being shown in its various operative positions.
Figure 4:
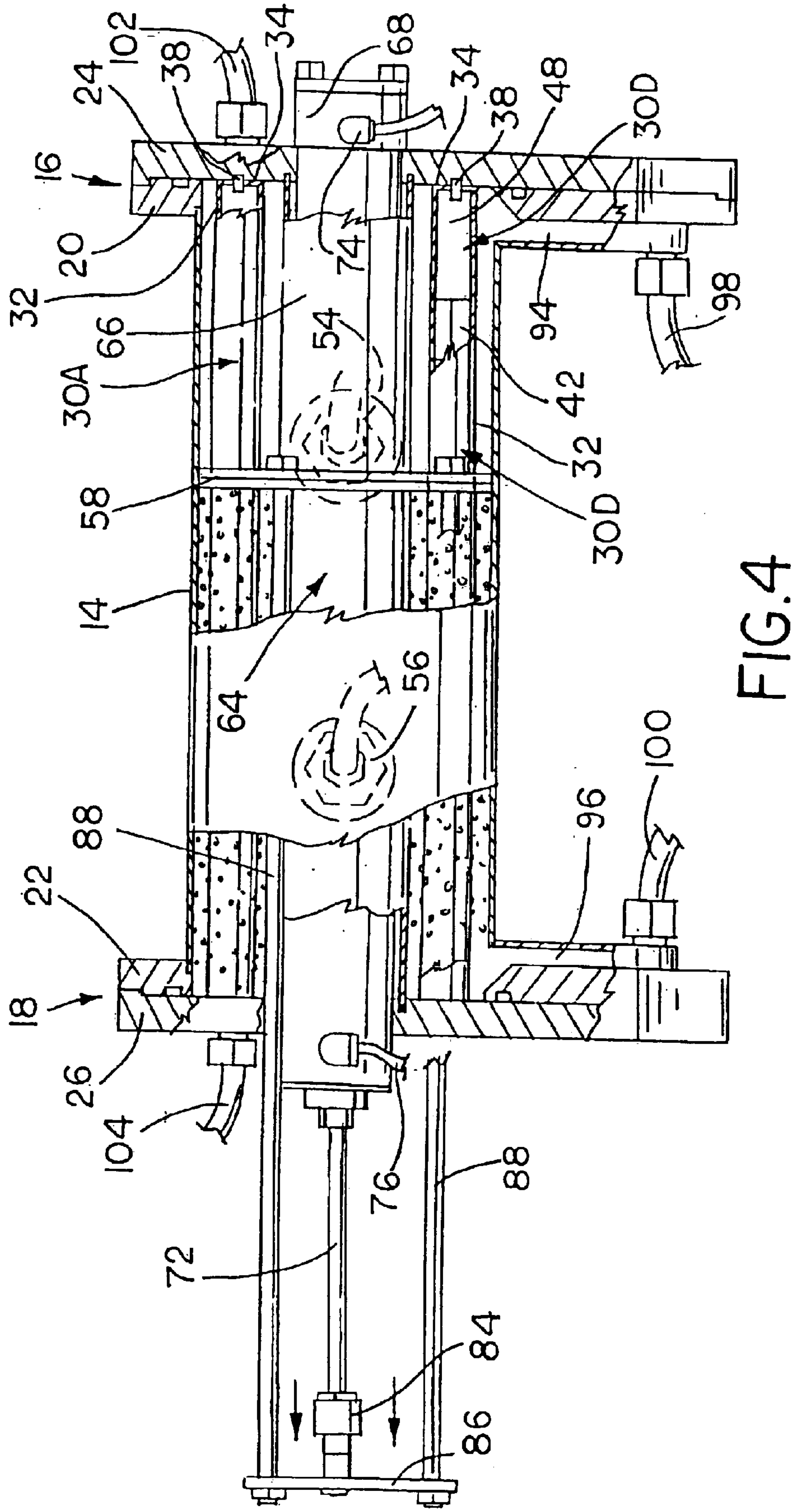
Figure 5:
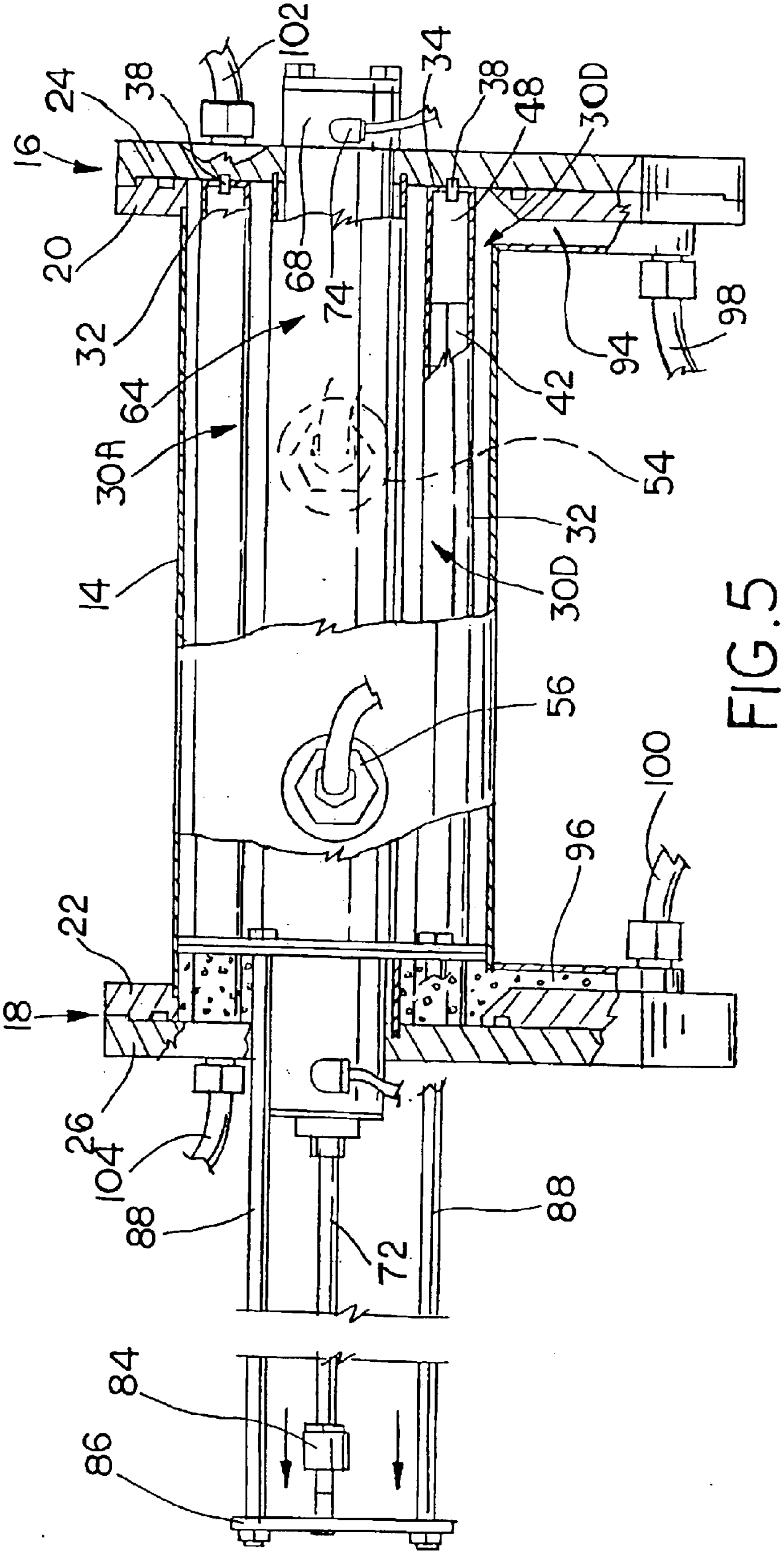

When it is desired to clean the magnetic particles off of the surfaces of the magnetic elements 30A–F, and assuming that the scraper plate 58 is in the position illustrated in FIG. 3, fluid is admitted into the hydraulic cylinder assembly 64 through fitting 74, thereby driving the piston (not shown) within the cylinder 66 to the left viewing the Figures, and forcing the piston rod 72 to the left viewing FIGS. 3–5. As illustrated in FIG. 4, as the scraper plate 58 travels to the left viewing the Figures, the magnetic particles will be swept to the left viewing the Figures with most of the particles remaining on the outer surface of the magnetic element 38 due to the magnetic attraction of the magnetic segments 42–46. As plate 58 is forced into the FIG. 5 position, which is the maximum travel position to the left viewing the Figures, the particles are scraped onto the non-magnetic end portions 50 of the magnetic elements 30A–F. At this time, the outlet port 56 is closed off, drain line 100 is opened, and fluid is continued to be pumped through inlet port 54. A small clearance exists between the outer circumferential surface of the scraper plate 58 and the inner surface of the housing portion 14. Accordingly, fluid entering the inlet 54, since it is blocked from being discharged through outlet port 56, communicates through the small gap or clearance between the scraper plate 58 and the housing 14. Accordingly, particles accumulated on the non-magnetic end portion 50 of the magnetic elements 30A–F will be flushed off of the magnetic elements and into the flushing chamber 96. Particles in flushing chamber 96 are discharged through drain line 100, into appropriate containers either for further processing or for discard.

The scraper plate 58 rod 72, push/pull plate 86 and the rods 88 remain in the position illustrated in FIG. 5 while the outlet port 56 is reopened and fluid is again communicated through the housing 14. When a quantity of magnetic particles are again accumulated on the magnetic elements 30A–F such that cleaning is again required, hydraulic fluid under pressure is admitted through fitting 76 into the cylinder 66, thereby driving the double acting piston (not shown) to the right, thereby also forcing the scraper plate 58 to the right. When the scraper plate is returned to the FIG. 3 position, the outlet port 56 is closed off and drain line 98 is opened to permit fluid to communicate around the scraper plate 58, to thereby flush the magnetic particles off of the non-magnetic end portions 48 of the magnetic elements 30A–5 and into the flushing chamber 94. The fluid in flushing chamber 94 is discharged through drain line 98 and is captured to be either disposed of or further processed.

Fluid lines 102, 104 may be provided to communicate fluid directly into the portion of the housing between the scraper plate 58 and the end plate 24 or 26, through which the non-magnetic portions 48 or 50 of the magnetic elements 30A–F extend. This fluid communicated through fluid lines 102, 104 flushes the particles from the end portions 48 or 50 of the magnetic elements 30A–F and into corresponding flushing chambers 94, 96, from which the fluid is discharged as described above through drain lines 98 and 100. If the lines 102, 104 are used to flush magnetic particles, the inlet port 54 and outlet port 56 remain open, permitting continued processing of fluid in which the magnetic particles are entrained even while particles cleaned from the magnetic elements 30A–5 are being flushed from the filter 10.

Figure 7:
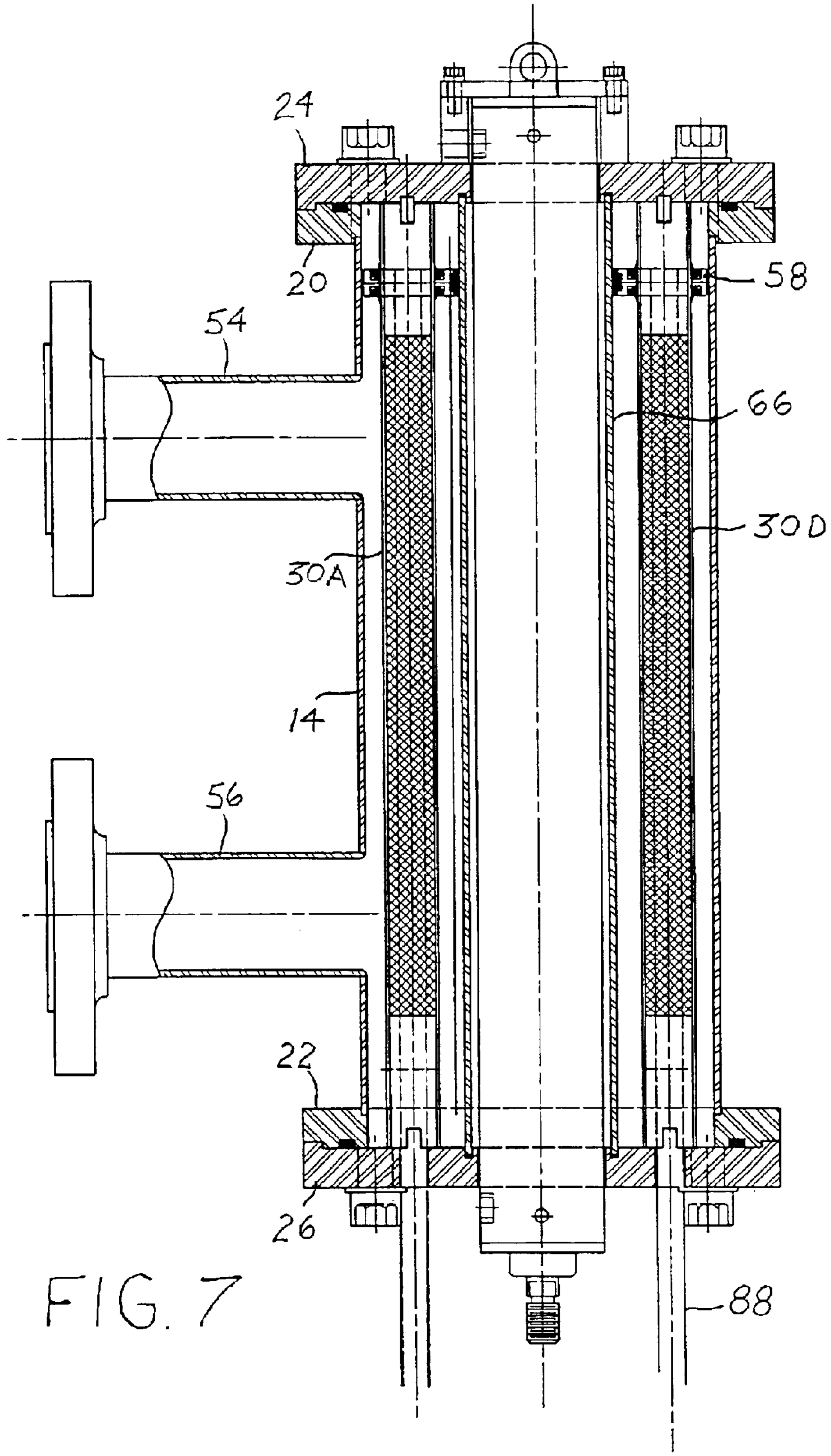
FIG. 7 is a longitudinal cross-sectional view showing an alternative location of the inlet and outlet ports.
Figure 8:
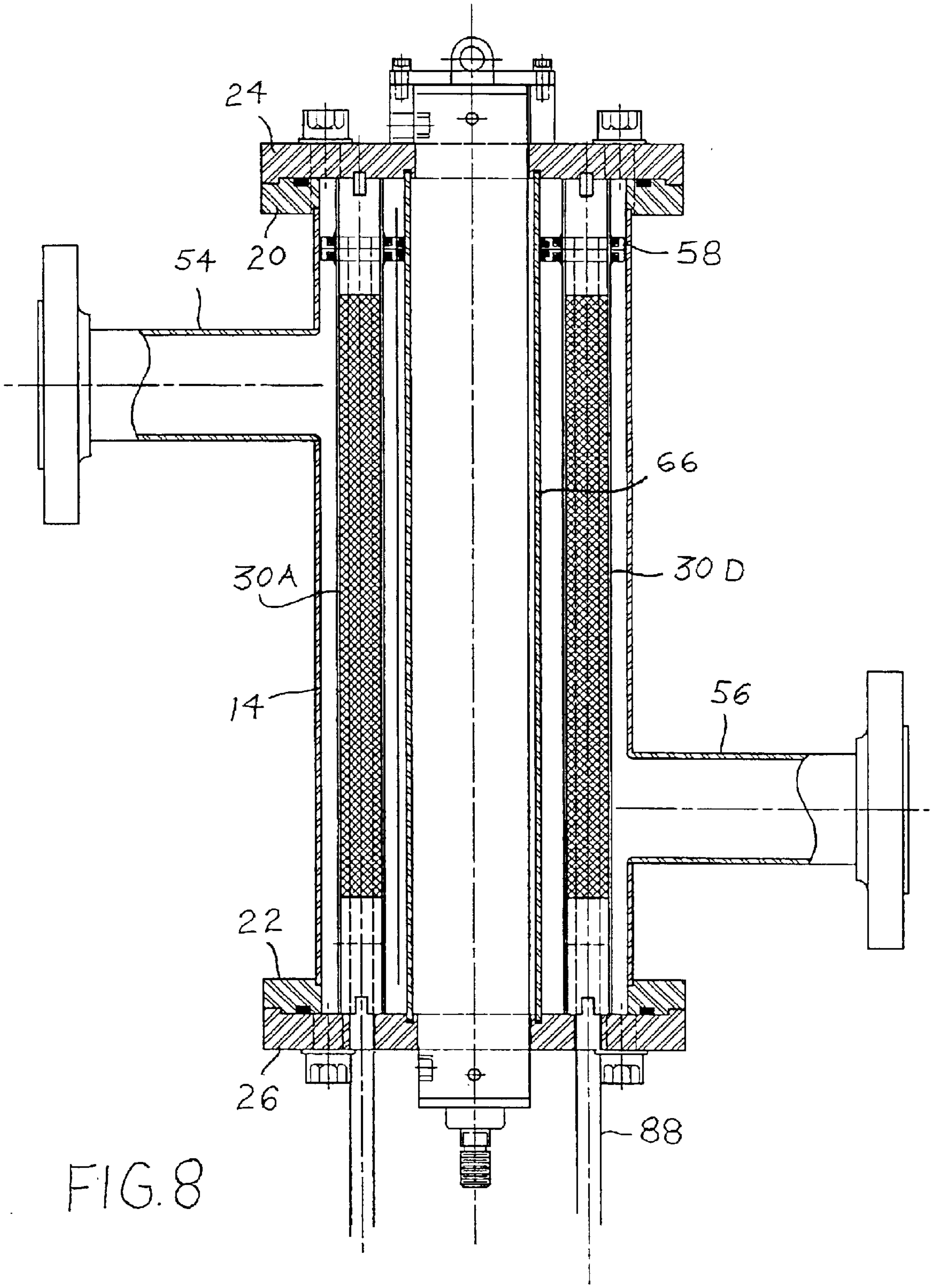
FIG. 8 is a longitudinal cross-sectional view showing the location of the inlet and outlet ports of the magnetic filter illustrated in FIGS. 1 and 2.

The filter of this invention has its inlet port 54 and outlet port 56 each located along the side of filter housing portion 14 in an offset or staggered relationship. In FIG. 7, as an alternative embodiment, inlet port 54 and outlet port 56 are shown at the same side of filter housing portion 14 in offset relationship relative to the longitudinal dimension of the filter. In FIG. 8 the inlet and outlet ports are shown on opposite sides filter housing portion 14 in a offset relationship relative to the longitudinal dimension of the filter. The offset relationship of the inlet prot 54 and outlet port 56 utilized in the filter constructions shown in FIGS. 7 and 8 produce a turbulent or mixing flow of the filtration medium or fluid as it passes through the filter. This turbulence increases in a magnetic filter the rate of metal particle removal or the filtration efficiency of the filter. Tests have shown, using ferrous particulate in the filtration medium which varied in size from 45 microns to 0.156 inches, that the filtration efficiency is approximately 70.4 percent when the flow through the filter from the inlet to the outlet is essentially laminar. With offset or staggered inlet and outlets, such as shown in FIGS. 7 and 8, the introduction of turbulent flow through the filter produced a filtration efficiency of 99.6 percent. Accordingly, the induced turbulent flow of the filtration medium around the magnetic filtration elements 30A–F causes an efficient removal of the metal particulates within the filtration medium, producing a filter of excellent efficiency.

The invention is not to be limited to the details above given but may be modified within the scope of the appended claims.

What is claimed is:

1. Magnetic filter for removing magnetic particles suspended in fluid comprising a housing having an inlet port for communicating said fluid into said housing and an outlet port for discharging said fluid from said housing, an elongated magnetic element means mounted in said housing for magnetically attracting and capturing on said magnetic element the magnetic particles entrained in said fluid, said inlet and outlet ports each located transversely relative to said magnetic element means and offset from each other so as to produce a turbulent flow of said fluid about the magnetic element means, and a scraper slidably mounted on said magnetic element, and actuator for periodically moving said scraper slidably mounted on said magnetic element to remove magnetic particles captured by said magnetic element from said magnetic element by scraping said particles toward one end of said magnetic element.

2. Magnetic filter as claim in claim 1, wherein said filter includes diverting means for diverting fluid communicated through said inlet port to said one end of said magnetic element after particles are scraped to said one end for flushing said particles into a chamber within said housing.

3. Magnetic filter as claimed in claim 2, wherein said diverting means includes a clearance between said scraper and said housing and a valve for closing said outlet port, wherein said particles are flushed into said chamber by closing said valve to cause fluid communicated through said inlet port to divert through said clearance to flush said particles into said chamber.

4. Magnetic filter as claimed in claim 1, wherein said housing includes an inlet fitting for communicating fluid into said housing at said one end of said magnetic element to flush particles from said one end of said magnetic element into said chamber.

5. Magnetic filter as claimed in claim 1, wherein said inlet and outlet ports are located on opposite sides of said housing.

6. Magnetic filter as claimed in claim 1, wherein said inlet and outlet ports are located on the same side of said housing.

* * * * *